US007619589B2

(12) United States Patent
Chae et al.

(10) Patent No.: US 7,619,589 B2
(45) Date of Patent: Nov. 17, 2009

(54) PLASMA DISPLAY AND DRIVING METHOD THEREOF

(75) Inventors: Su-Yong Chae, Suwon-si (KR); Hak-Cheol Yang, Suwon-si (KR); Sang-Hoon Yim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 720 days.

(21) Appl. No.: 11/285,491

(22) Filed: Nov. 21, 2005

(65) Prior Publication Data

US 2006/0109213 A1 May 25, 2006

(30) Foreign Application Priority Data

Nov. 24, 2004 (KR) ...................... 10-2004-0096825

(51) Int. Cl.
*G09G 3/28* (2006.01)
*G09G 5/00* (2006.01)
*G06F 3/038* (2006.01)

(52) U.S. Cl. ............................ 345/67; 345/63; 345/204

(58) Field of Classification Search ................... 345/60, 345/63, 67

See application file for complete search history.

(56) References Cited

U.S. PATENT DOCUMENTS

| | | | | |
|---|---|---|---|---|
| 6,104,362 | A * | 8/2000 | Kuriyama et al. | 345/63 |
| 6,466,186 | B1 | 10/2002 | Shimizu et al. | |
| 2001/0005188 | A1 | 6/2001 | Watanabe | |
| 2007/0035474 | A1 * | 2/2007 | Yamamoto et al. | 345/60 |

FOREIGN PATENT DOCUMENTS

| | | | |
|---|---|---|---|
| CN | 1388950 | | 1/2003 |
| EP | 1 331 623 | A1 | 7/2003 |
| EP | 1 366 484 | B1 | 2/2005 |
| JP | 7-219474 | | 8/1995 |
| JP | 8-305321 | | 11/1996 |
| JP | 9-244575 | | 9/1997 |
| JP | 2000-322025 | A | 11/2000 |
| JP | 2001-13920 | | 1/2001 |
| JP | 2001-67041 | | 3/2001 |

(Continued)

OTHER PUBLICATIONS

Patent Abstracts of Japan, Publication No. 07-219474; Date of Publication: Aug. 18, 1995; in the name of Shigetoshi Tomio et al.

(Continued)

*Primary Examiner*—Sumati Lefkowitz
*Assistant Examiner*—Charles Hicks
(74) *Attorney, Agent, or Firm*—Christie, Parker & Hale, LLP

(57) ABSTRACT

A plasma display panel and a method thereof is described. A frequency of a sustain pulse varies according to a screen load ratio in each subfield or frame. The frequency of the sustain pulse is determined such that power consumption of the plasma display panel, which is a function of the active power and the reactive power of the sustain pulse, is minimized. When the screen load ratio is increased, the frequency of the sustain pulse is increased since the decrease of the active power is increased and the reactive power is maintained.

24 Claims, 9 Drawing Sheets

FOREIGN PATENT DOCUMENTS

| | | | |
|---|---|---|---|
| JP | 2001-075526 | A | 3/2001 |
| JP | 2001-337647 | | 12/2001 |
| JP | 2002-062843 | A | 2/2002 |
| JP | 2002-099245 | A | 4/2002 |
| JP | 2004-045704 | A | 2/2004 |
| JP | 2004-157233 | | 6/2004 |
| KR | 10-2003-0074105 | A | 9/2003 |
| WO | WO 02/11111 | | 2/2002 |
| WO | WO 2004/114270 | | 12/2004 |

OTHER PUBLICATIONS

Patent Abstracts of Japan, Publication No. 08-305321; Date of Publication: Nov. 22, 1996; in the name of Shigeki Kameyama et al.

Patent Abstracts of Japan, Publication No. 09-244575; Date of Publication: Sep. 19, 1997; in the name of Yoshimasa Awata et al.

Patent Abstracts of Japan, Publication No. 2001-013920; Date of Publication: Jan. 19, 2001; in the name of Katsuya Irie et al.

Patent Abstracts of Japan, Publication No. 2001-067041; Date of Publication: Mar. 16, 2001; in the name of Yasunori Takahashi.

Patent Abstracts of Japan, Publication No. 2004-157233; Date of Publication: Jun. 03, 2004; in the name of Taiji Noguchi et al.

European Search Report, dated Apr. 27, 2006, for Application No. 05111050.0, in the name of Samsung SDI Co., Ltd.

* cited by examiner

PLASMA DISPLAY AND DRIVING METHOD THEREOF

CROSS-REFERENCE TO RELATED APPLICATION

This application claims priority to and the benefit of Korean Patent Application No. 10-2004-0096825 filed in the Korean Intellectual Property Office on Nov. 24, 2004, the entire content of which is incorporated herein by reference.

BACKGROUND OF THE INVENTION

1. Field of the Invention

The present invention relates to a plasma display and a method of driving the plasma display.

2. Description of the Related Art

A plasma display is a flat panel display that uses plasma generated by gas discharge to display characters or images. It includes, depending on its size, more than several scores to millions of pixels arranged in a matrix pattern.

One frame of the plasma display is divided into a plurality of subfields, and each subfield has a reset period, an address period, and a sustain period. The reset period is for initializing the status of each discharge cell so as to facilitate an addressing operation on the discharge cell. The address period is for selecting turn-on/turn-off cells (i.e., cells to be turned on or off) and accumulating wall charges to the turn-on cells (i.e., addressed cells).

In the sustain period, a sustain pulse is alternately applied to pairs of scan electrodes and sustain electrodes. When the wall charges are formed between the scan electrode and the sustain electrode by the address discharge in the address period, an image is displayed since a sustain discharge is generated between the scan electrode and the sustain electrode by the sustain pulse and wall charges.

Since the plasma display uses a high level voltage for firing a discharge, power consumption is increased when a screen load ratio is great (i.e., when a lot of discharge cells are turned on). Accordingly, a control method for controlling the power consumption is used in the plasma display such that the power consumption is not increased over a predetermined value. Such is conventionally accomplished by controlling the number of the sustain pulses according to a screen load ratio for one frame. Such a power consumption control method is for controlling the power consumption according to the screen load ratio for one frame regardless of discharge efficiency.

SUMMARY OF THE INVENTION

The present invention advantageously provides a plasma display and a method of controlling its power consumption such that the power consumption is minimized. In one exemplary embodiment, the frequency of a sustain pulse is varied according to a screen load ratio in a subfield.

An exemplary embodiment of a plasma display according to the present invention includes a plasma display panel (PDP), a driver, and a controller. The PDP includes a number of first electrodes and a number of second electrodes for performing a display operation in cooperation with the first electrodes. The driver applies a sustain pulse to the first electrode or the second electrode such that a voltage obtained by subtracting a voltage at the second electrode from a voltage at the first electrode may alternately be a positive voltage and a negative voltage in a sustain period. The controller divides each frame into a number of subfields, each having a weight value, and controls a frequency of the sustain pulse by calculating a screen load ratio of each subfield or frame.

The controller may cause a frequency of the sustain pulse in a first subfield having a first screen load ratio to be different from a frequency of the sustain pulse in a second subfield having a second screen load ratio. Also, the second screen load ratio may be greater than the first screen load ratio. The controller may also cause the frequency of the sustain pulse in the second subfield to be higher than the frequency of the sustain pulse in the first subfield. In addition, the controller may cause a voltage variation time of the sustain pulse in the second subfield to be shorter than a voltage variation time of the sustain pulse in the first subfield.

The controller may cause a frequency of the sustain pulse in a first frame having a first screen load ratio to be different from a frequency of the sustain pulse in a second frame having a second screen load ratio. Also, the second screen load ratio may be greater than the first screen load ratio. The controller may cause the frequency of the sustain pulse in the second frame to be higher than the frequency of the sustain pulse in the first frame. In addition, the controller may control a voltage variation time of the sustain pulse in the second frame to be shorter than a voltage variation time of the sustain pulse in the first frame.

In an exemplary embodiment of a driving method for driving a plasma display, the plasma display includes a number of first electrodes and a number of second electrodes for performing a display operation with the first electrodes. The plasma display is driven by each frame divided into a number of subfields, each having a weight value. According to the driving method, screen load ratios are determined in each subfield from input image data. Frequencies of a sustain pulse are determined in each subfield according to the determined screen load ratio. And an image is displayed by applying the sustain pulse to at least one of the first and second electrode according to the determined frequency of the sustain pulse in each subfield.

In another exemplary embodiment of a driving method for driving a plasma display, the plasma display includes a number of first electrodes and a number of second electrodes for performing a display operation with the first electrode. According to the driving method, screen load ratios are determined in each subfield from input image data. Frequencies of a sustain pulse are determined in each subfield according to the determined screen load ratios. And an image is displayed by applying the sustain pulse to at least one of the first and second electrode according to the determined frequency of the sustain pulse in the each subfield.

In another exemplary embodiment of the present invention, a plasma display includes a controller. The controller drives by each frame, which is divided into a number of subfields, each having a weight value. The controller determines a frequency of the sustain pulse in the subfield that allows a sum of active power and reactive power caused by the sustain pulse to be minimized.

DETAILED DESCRIPTION OF THE EMBODIMENTS

Figure 1:
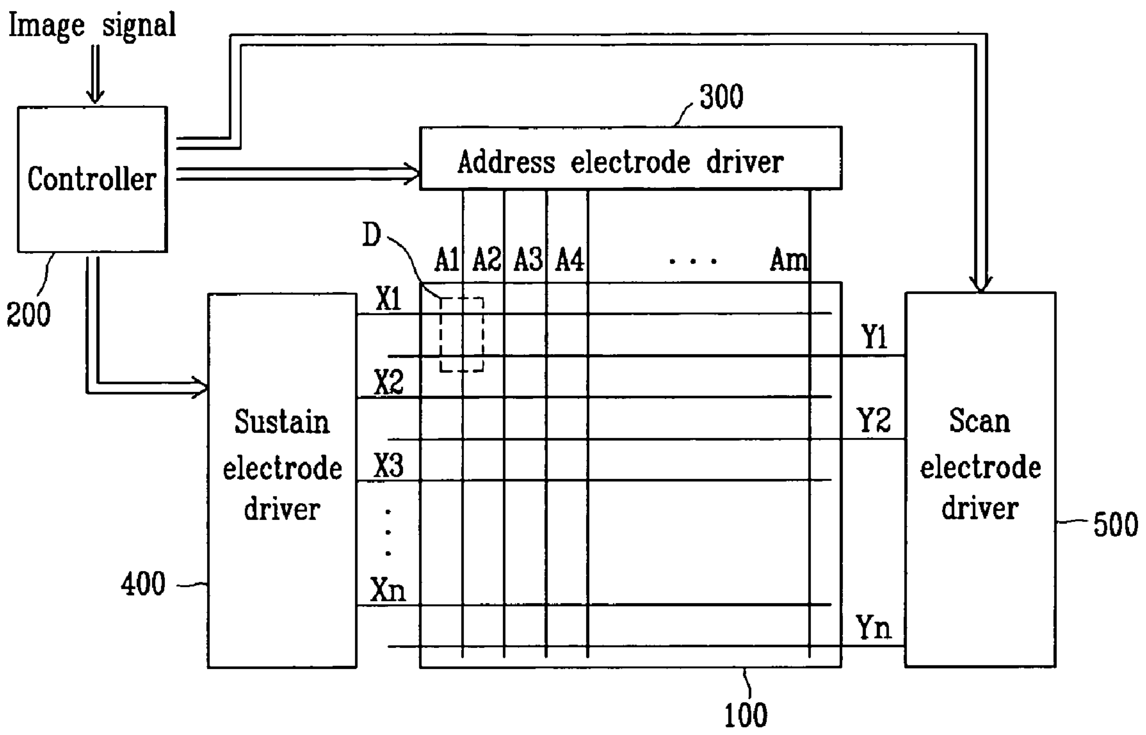
FIG. 1 shows a schematic diagram of a plasma display according to an exemplary embodiment of the present invention.

Referring to FIG. 1, the plasma display according to an exemplary embodiment of the present invention includes a plasma display panel (PDP) 100, a controller 200, an address electrode driver 300, a sustain electrode driver 400, and a scan electrode driver 500.

The PDP 100 includes a number of address electrodes A1 to Am (hereinafter referred to as "A electrodes"), each A electrode extending in a column or direction, and a number of sustain electrodes and scan electrodes X1 to Xn and Y1 to Yn (hereinafter referred to as "X electrodes" and "Y electrodes", respectively), each extending in a row direction by pairs. The X electrodes X1 to Xn are formed in correspondence to the Y electrodes Y1 to Yn, and a display operation is performed by the X and Y electrodes in the sustain period. The Y and X electrodes Y1 to Yn and X1 to Xn are arranged perpendicular to the A electrodes A1 to Am. A discharge space formed at an area where the A electrodes A1 to Am cross the X electrodes X1 to Xn and the Y electrodes Y1 to Yn forms a discharge cell, D.

The controller 200 outputs X electrode, Y electrode, and A electrode driving control signals after receiving an image signal. In addition, the controller 200 operates on each frame, which is divided into a number of subfields, each having a weight value.

In the address period, the scan electrode driver 500 applies a sustain pulse to the Y electrodes Y1 to Yn according to an order for selecting the Y electrodes Y1 to Yn (e.g., in sequence), and the address electrode driver 300 receives the address driving control signal from the controller 200 and applies an address voltage for selecting turn-on cells to the respective A electrodes when a scan pulse is applied to the respective Y electrodes. That is, in the address period, discharge cells defined by the Y electrodes and the A electrodes are selected as the turn-on discharge cells. The scan pulse is applied to the Y electrodes and the address voltage is applied to the A electrodes when the scan pulse is applied to the Y electrodes.

In the sustain period, the sustain electrode driver 400 and the scan electrode driver 500 alternately apply the sustain pulse to the X electrodes X1 to Xn and the Y electrodes Y1 to Yn upon receiving the control signals from the controller 200.

Figure 2:
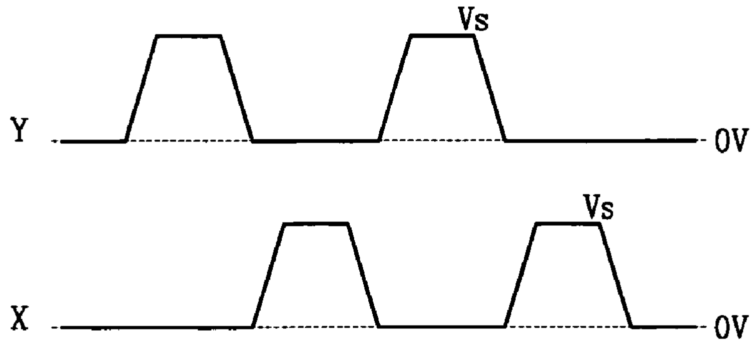
FIG. 2 shows a diagram representing sustain pulses according to an exemplary embodiment of the present invention.

Referring to FIG. 2, a sustain pulse used in an exemplary embodiment of the present invention will be described. The sustain pulse alternately has a sustain discharge voltage Vs and a ground voltage 0V. Sustain pulses of inverse phases are applied to the Y electrode and the X electrode. A voltage lower than a discharge firing voltage between the X and Y electrodes is used for the sustain discharge voltage Vs so as to prevent the turn-off discharge cell from being misfired.

Since the sustain discharge voltage Vs is lower than the discharge firing voltage, a predetermined wall voltage is required to be formed between the Y and X electrodes to maintain the sustain discharge by the sustain pulse that is alternately applied to the Y and X electrodes. That is, while negative wall charges are accumulated on the Y electrodes and positive wall charges are accumulated on the X electrodes since the sustain discharge voltage Vs is applied to the Y electrode and the ground voltage is applied to the X electrodes, a subsequent sustain discharge may be generated when the sustain discharge voltage Vs is applied to the X electrodes and the ground voltage is applied to the Y electrodes. Therefore, the sustain discharge voltage Vs of the sustain pulse is required to be maintained for a predetermined time in order to form wall charges on the electrodes.

In addition, since the Y and X electrodes operate as capacitive loads i.e., capacitors, when the sustain pulse is applied, the power consumption is increased because reactive power for injecting charges to the capacitive loads is consumed to apply the sustain pulse to the Y or X electrodes. The plasma display usually applies the sustain pulse to the Y and X electrodes by using a power recovery circuit for recovering and reusing the reactive power. The power recovery circuit recovers energy and charges the energy to an external capacitor while discharging the capacitive load by using resonance between an inductor and the capacitive load formed by the Y and X electrodes. The power recovery circuit then uses the energy charged in the external capacitor when the capacitive load is charged by using the resonance. The power recovery circuit is formed on the sustain electrode driver 400 and/or the scan electrode driver 500.

A voltage at the Y electrode is increased from 0 volts (V) to the Vs voltage or is decreased from the Vs voltage to 0V in order to apply the sustain pulse to the Y electrode by using the power recovery circuit. The voltage at the Y electrode may not vary immediately. It takes a predetermined time (hereinafter referred to as "rising time") for the voltage at the Y electrode to be increased from 0V to the Vs voltage by the resonance. In a like manner, it takes another predetermined time (hereinafter referred to as "falling time") for the voltage at the Y electrode to be decreased from the Vs voltage to 0V by the resonance.

Figure 3:
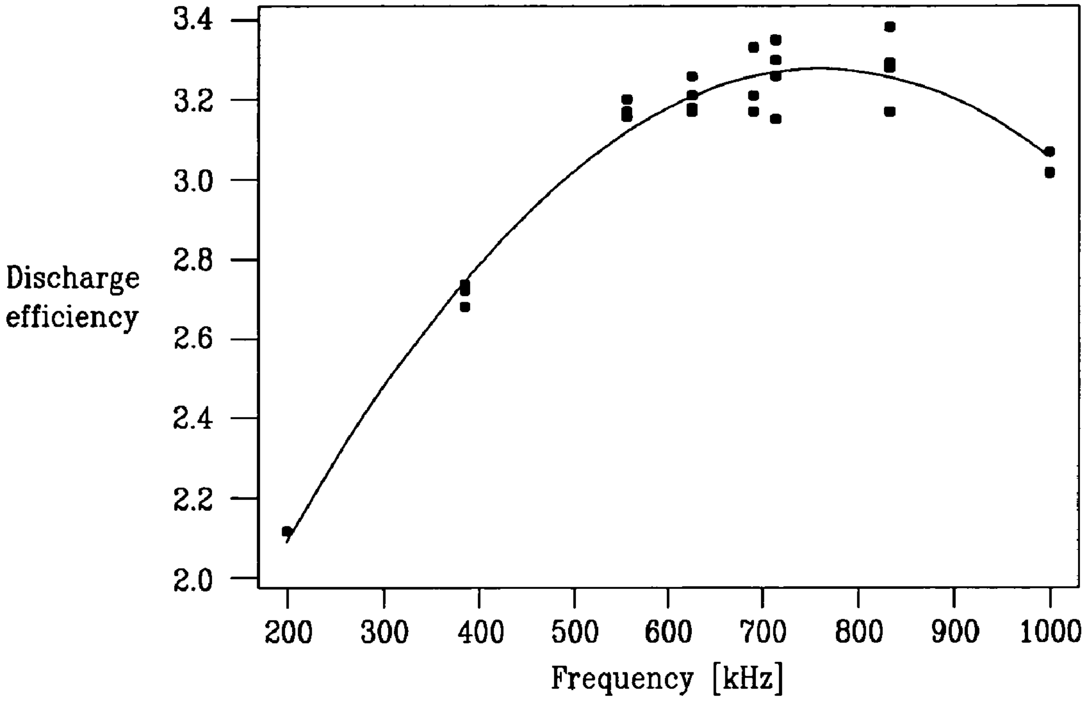
FIG. 3 shows a graph representing a relation between frequency and discharge efficiency of a sustain pulse.
Figure 5:
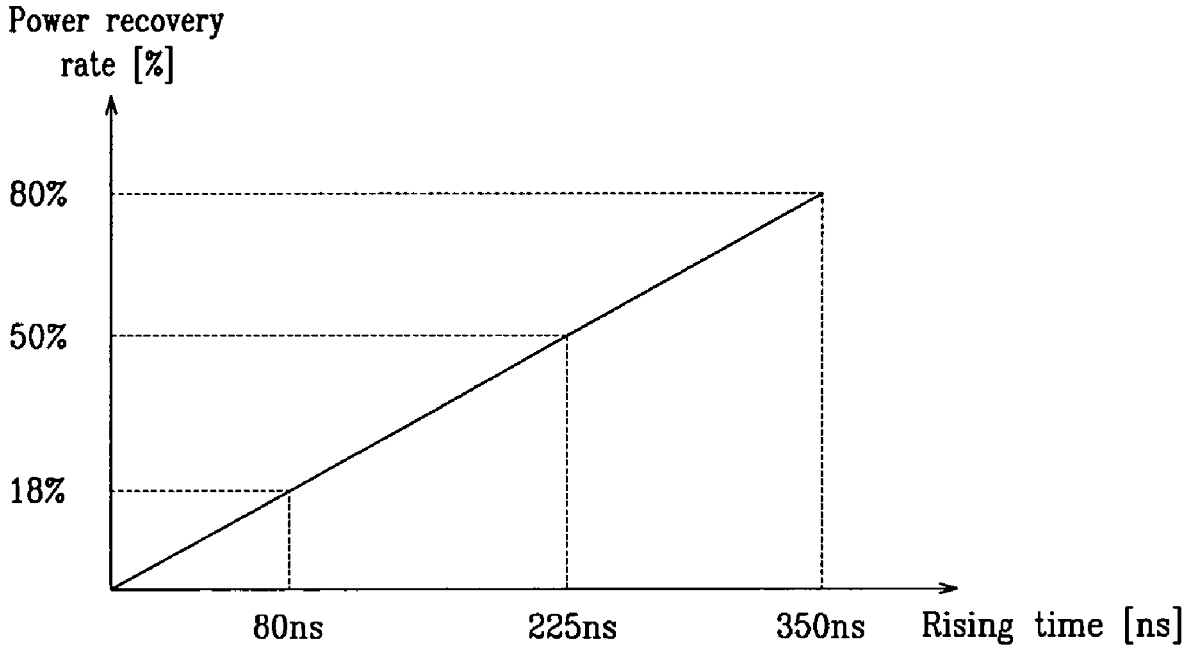
FIG. 5 shows a graph representing power recovery rates of a power recovery circuit according to a rising time of a sustain pulse.

Referring to FIGS. 3 and 5, a relation between a frequency and discharge efficiency of the sustain discharge pulse having the rising and falling times will be described.

FIG. 3 shows a graph representing a relation between the frequency and the discharge efficiency of the sustain pulse when a gap between the Y and X electrodes is 0.0075 cm, the sustain discharge voltage is 220V, a gas pressure in the discharge space is 450 Torr, and a partial pressure of xenon (Xe), a discharge gas injected into the discharge space, is 25%. The discharge efficiency is calculated by a ratio of brightness to power consumption. FIG. 4A to FIG. 4D show diagrams representing the sustain pulses when the frequencies of the sustain pulses are 200 kHz, 400 kHz, 500 kHz, and 700 kHz, respectively. FIG. 5 shows a graph representing a power recovery rate of the power recovery circuit according to the rising time of the sustain pulse.

Referring back to FIG. 3, since a subsequent discharge appropriately occurs by priming particles formed by a previous sustain discharge when the frequency is increased, the discharge efficiency is increased as the frequency of the sustain pulse is increased. However, the discharge efficiency is decreased when the frequency is increased over 750 kHz, which relates to the power recovery circuit described above.

Figure 4A:
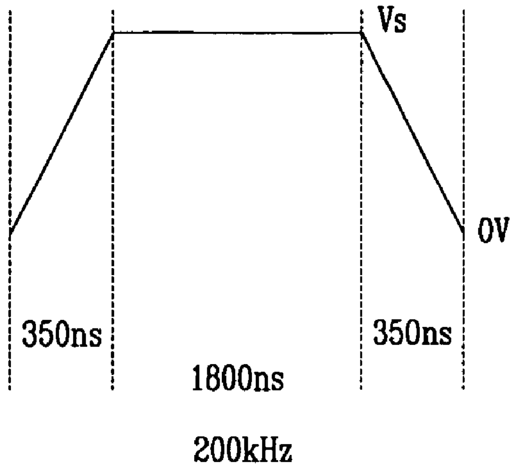
FIGS. 4A, 4B, 4C and 4D show diagrams representing sustain pulses when frequencies of the sustain pulses are 200 kHz, 400 kHz, 500 kHz, and 700 kHz, respectively.
Figure 4B:
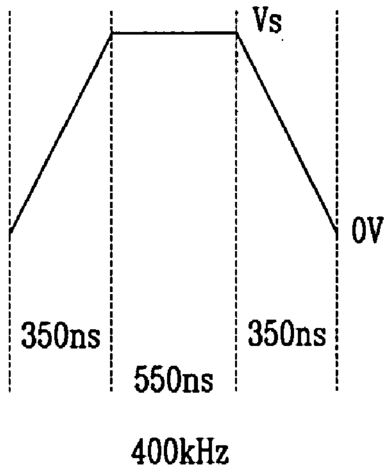
Figure 4C:
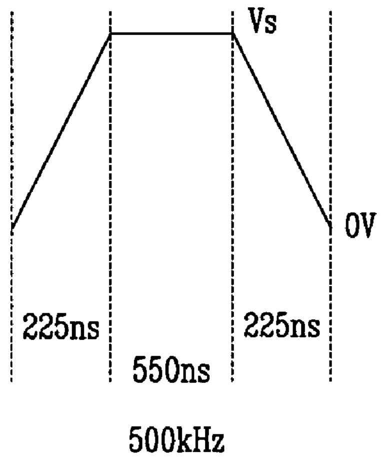
Figure 4D:
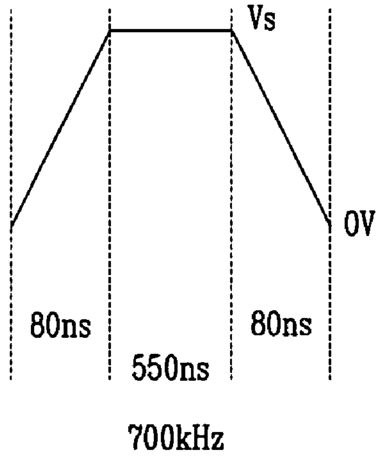

Referring back to FIG. 4A and FIG. 4B, the time for maintaining the sustain discharge voltage Vs is decreased from 1800 ns to 550 ns when the frequency of the sustain pulse is increased from 200 kHz to 400 kHz. The rising time and the falling time of the sustain pulse are also decreased after the time for maintaining the sustain discharge voltage Vs is decreased to a minimum time for forming the wall charges (e.g., 550 ns). Referring to FIG. 4C and FIG. 4D, the rising time and falling time are decreased to 225 ns when the frequency of the sustain pulse is 500 kHz, and the rising time and falling time are decreased to 80 ns when the frequency of the sustain pulse is 700 kHz.

Because the rising time and falling time of the sustain pulse are determined by capacitive and inductive components forming the resonance, and the capacitive component is determined according to characteristics of the PDP, the rising time and falling time may be controlled by controlling a size of the inductor used in the power recovery circuit. That is, the rising time and falling time of the sustain pulse may be decreased by decreasing the size of the inductor.

The X and Y electrodes are coupled with the sustain electrode driver 400 and the scan electrode driver 500, respectively, through a flexible printed circuit (FPC) pattern, which involves a parasitic inductance component. However, when the size of the inductor is decreased, the power recovery rate of the power recovery circuit is also decreased since the effect of the parasitic inductor component is increased when the resonance is formed in rising and falling times. As shown in FIG. 5, the power recovery rate is decreased as the rising time of the sustain pulse is decreased. Accordingly, the reactive power is increased as the power recovery rate is decreased.

Referring back to FIG. 3 and FIG. 4A to FIG. 4D, since the reactive power is constant when the frequency is below 400 kHz, the active power is decreased due to the increase of the frequency, and therefore the discharge efficiency is increased. In a frequency range between 400 kHz and 700 kHz, while the reactive power is increased the discharge efficiency may be increased since the increase of the reactive power is less than the decrease of the active power. In addition, in a frequency range over 700 kHz, the discharge efficiency is decreased since the increase of the reactive power is greater than the decrease of the active power. Referring to FIG. 3, the discharge efficiency is maximized since the power consumption is minimized when the frequency of the sustain pulse is approximately 700 kHz.

The reactive power is constant regardless of the number of the turn-on discharge cells since the reactive power is determined by the rising and falling times of the sustain pulse, but the active power is affected by the number of the turn-on discharge cells since the active power is generated by the sustain discharge. That is, when a greater number of discharge cells are to be turned on, the active power becomes higher, and accordingly, the decrease of the active power becomes more rapid as the frequency of the sustain pulse is increased. That is, when the number of the turn-on discharge cells is greater than the measurement conditions of FIG. 3, the discharge efficiency may be increased for a frequency even higher than 700 kHz since the active power decreases more rapidly as the frequency increases. For the same reason, when the number of the turn-on discharge cells is less than the measurement conditions of FIG. 3, the discharge efficiency may be increased only for a frequency lower than 70 kHz, since the active power decreases less rapidly as the frequency increases.

According to the exemplary embodiment of the present invention, the frequency of the sustain pulse causing the increase of the discharge efficiency varies according to the number of the turn-on discharge cells, and therefore the frequency of the sustain pulse is controlled according to the number of the turn-on discharge cells.

Figure 6:
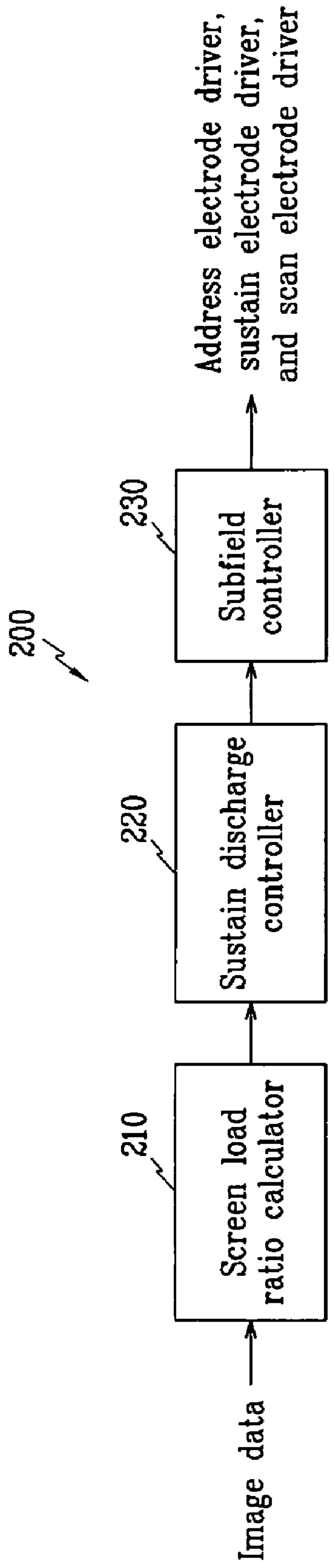
FIG. 6 shows a block diagram representing a controller according to an exemplary embodiment of the present invention.
Figure 7:
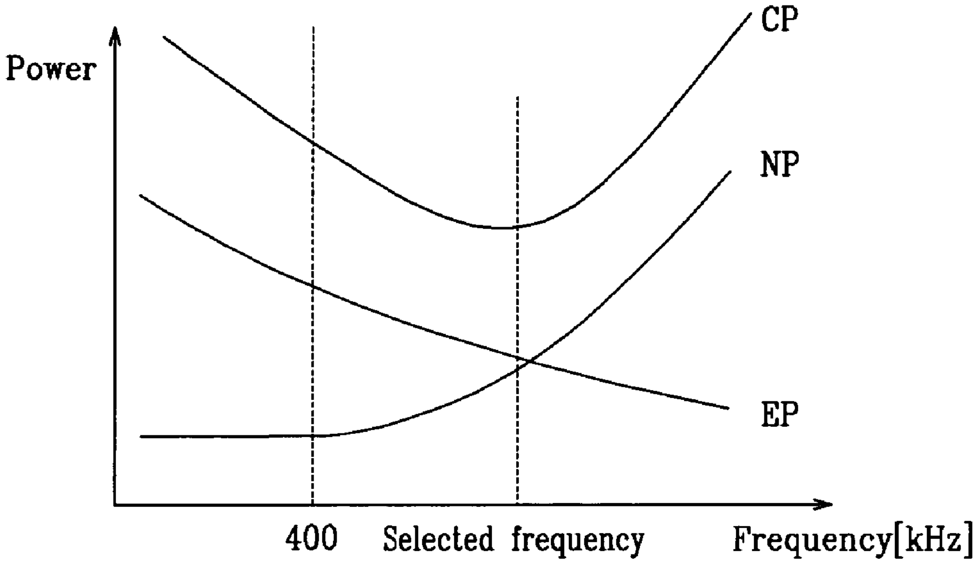
FIG. 7 shows a graph representing a relation between reactive power and active power according to a frequency of a sustain pulse.

Referring to FIGS. 6 and 7, the controller for controlling the frequency of the sustain pulse will be described. FIG. 6 shows a block diagram representing the controller 200 according to the exemplary embodiment of the present invention. FIG. 7 shows a graph representing a relation between the reactive power and the active power according to the frequency of the sustain pulse.

Referring to FIG. 6, the controller 200 includes a screen load ratio calculator 210, a sustain discharge controller 220, and a subfield controller 230. The screen load ratio calculator 210 calculates a screen load ratio of each subfield and a screen load ratio of one frame from input image data. The screen load ratio of each subfield is defined by the number of discharge cells turned on in a corresponding subfield. The screen load ratio of one frame is defined by an average signal level (ASL) of the image data of the frame.

The screen load ratio calculator 210 determines the screen load ratios of corresponding subfields by adding the numbers of the discharge cells turned on in each subfield. The number of discharge cells are added after determining whether the discharge cell is turned on or off in the subfield based on the image data corresponding to the discharge cells. For example, assuming that one frame is divided into eight subfields SF1 to SF8, respectively having 1, 2, $2^2$, $2^3$, $2^4$, $2^5$, $2^6$, $2^7$ weight values, subfield data corresponding to image data of a grayscale 139 are "11010001" in an order of subfield arrangement. At this time, "1" indicates a discharge cell turned on in a subfield, and "0" indicates a discharge cell turned off in the subfield. As described, since the image data corresponding to discharge cells indicate whether the discharge cells are turned on or off in each subfield, the screen load ratio of each subfield may be calculated.

The screen load ratio calculator 210 also calculates the ASL as shown in Equation 1. The screen load ratio of a frame is greater when the ASL is great, and is lower when the ASL is low.

Equation 1:

$$\text{i) } ASL = \left(\sum_V R_n + \sum_V G_n + \sum_V B_n\right)/3N,$$

where $R_n$, $G_n$, and $B_n$ denote signal levels of R, G, and B image data, respectively, V denotes one frame, and 3N denotes the number of the R, G, and B image data input for one frame.

The sustain discharge controller 220 determines a total number of sustain pulses allocated to one frame according to the screen load ratio of one frame. That is, the sustain discharge controller 220 decreases the total number of the sustain pulses when the screen load ratio of the frame is great since the power consumption is increased, and increases the total number of the sustain pulses when the screen load ratio of the frame is low since the number of discharge cells is small and the power consumption is decreased.

The relation between the number of the sustain pulses and the screen load ratio may be stored as a lookup table in a memory. The determined sustain pulses are allocated to the respective subfields in proportion to weight values of the respective subfields.

The sustain discharge controller 220 determines the frequency of the sustain pulse according to the screen load ratio of each subfield. As described above, the decrease of the active power consumption is also increased according to the increase of the frequency of the sustain pulse since the active power is increased when the screen load ratio is great. Accordingly, compared to a case where the screen load ratio is relatively low, an optimum frequency is set to be higher when the screen load ratio is great. The frequencies of the sustain pulses according to the screen load ratio may be stored for each subfield as a lookup table in a memory of the sustain discharge controller 220.

The subfield controller 230 controls the sustain electrode driver 400 and the scan electrode driver 500 so as to apply the sustain pulse to the X and the Y electrodes according to the frequency of the sustain pulse of each subfield determined by the sustain discharge controller 220. The subfield controller 230 also controls the address electrode driver 300 according to subfield data indicating whether the discharge cells are turned on or off in each subfield.

That is, in a subfield having subfield data of a discharge cell equal to "1," the address electrode driver 300 applies an address pulse to the A electrode of the discharge cell when the sustain pulse is applied to the Y electrode of the discharge cell. In a subfield having subfield data of a discharge cell equal to "0," the address electrode driver 300 applies a non-address voltage to the A electrode of the discharge cell when the scan pulse is applied to the Y electrode of the discharge cell.

Figure 10:
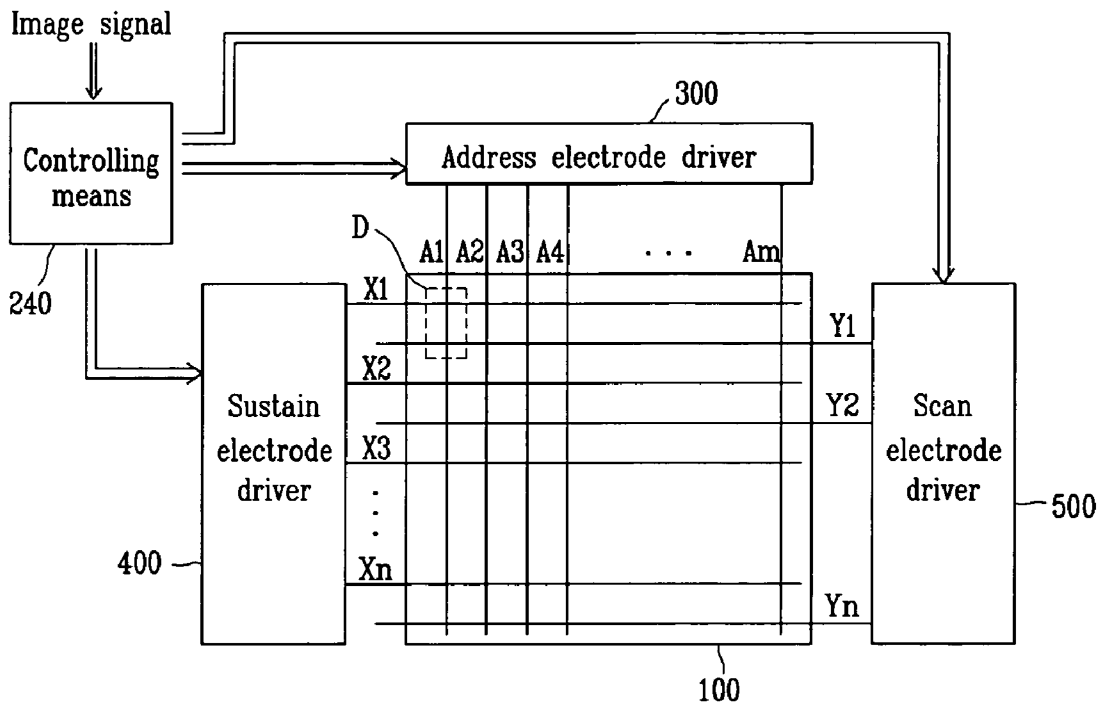
FIG. 10 shows a schematic diagram of a plasma display according to another exemplary embodiment of the present invention.

Alternately, referring to FIG. 10, a controlling means 240 would similarly minimize an amount of power consumption of the plasma display panel by determining a frequency of the sustain pulse allowing the sum of the active power and the reactive power to be minimized. The controlling means 240 may include any functionality enabling the controlling means 240 to determine a frequency of the sustain pulse allowing the sum of the active power and the reactive power to be minimized.

Referring to both FIG. 10 and FIG. 6, controlling means 240 and the controller 200 may further include an analogue-to-digital converter for converting an input analog image signal into digital image data, and a gamma corrector for correcting gamma-corrected image data. In addition, the controlling means 240 and the controller 200 may perform error diffusion for spreading errors of the image data to neighboring cells so as to increase expression of grayscales of the image data.

A method for determining the frequency of the sustain pulse according to the screen load ratio will be described with reference to FIG. 7. The number of sustain pulses allotted to an arbitrary subfield is determined according to the total number of the sustain pulses, which is determined based on the screen load ratio of the frame having the arbitrary subfield. The active power (EP) and the reactive power (NP) in the subfield determine the frequency of the sustain pulse.

Then, as shown in FIG. 7, the active power (EP) is decreased as the frequency of the sustain pulse is increased, and the reactive power (NP) is increased as the frequency of the sustain pulse is increased when the frequency is greater than a predetermined frequency (400 kHz in FIG. 7). A power consumption (CP) is the sum of the active power (EP) and the reactive power (NP). The frequency having the minimum power consumption (CP) value is the selected frequency of the sustain pulse.

The frequencies of the sustain pulses of the respective subfields according to the screen load ratio are determined by performing the above-described operation for all the screen load ratios and subfields. Values of the frequencies are stored in a lookup table in a memory. The sustain discharge controller 220 determines the frequency of the sustain pulse in a corresponding subfield by reading the lookup table stored in the memory according to the screen load ratio. As described above, the frequency of the sustain pulse is increased as the screen load ratio of the subfield is increased.

While the sustain pulse has been described as the pulse type shown in FIG. 2 the pulse type is merely one exemplary embodiment of the present invention, and the present invention can cover various pulse types.

Figure 8:
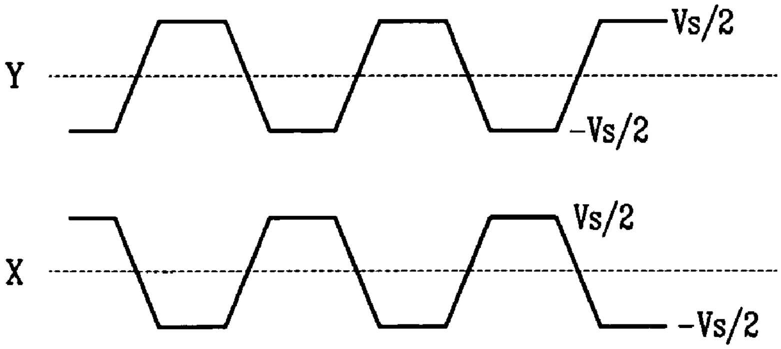
FIG. 8 shows a diagram representing sustain pulses according to another exemplary embodiment of the present invention.
Figure 9:
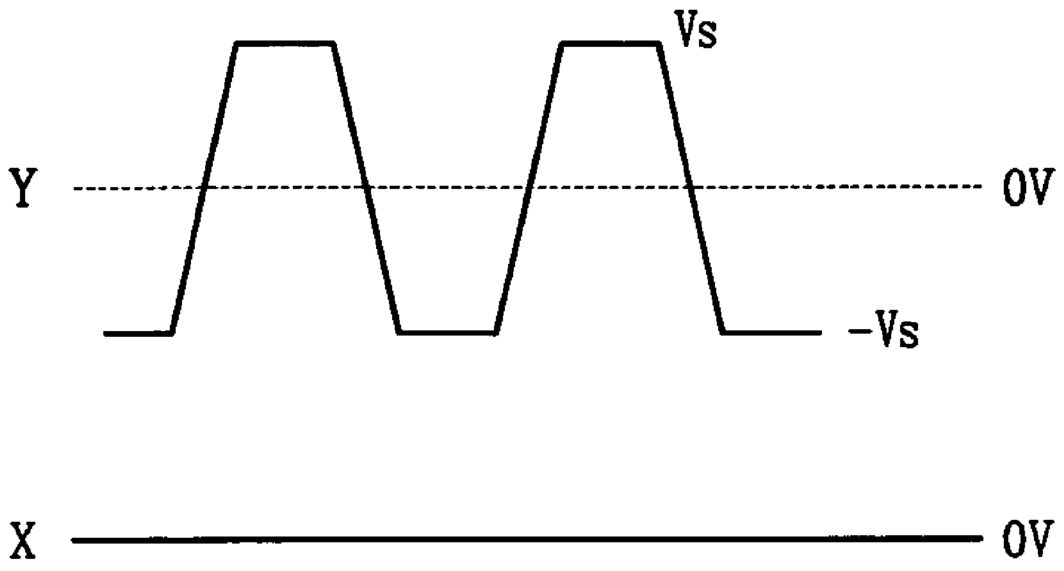
FIG. 9 shows a diagram representing sustain pulses according to another exemplary embodiment of the present invention.

FIG. 8 and FIG. 9 respectively show diagrams representing the sustain pulses according to other exemplary embodiments of the present invention. As shown in FIG. 8, a sustain pulse has an alternating Vs/2 voltage and −Vs/2 voltage when the sustain pulse is respectively applied to the X and Y electrodes. Sustain pulses having inverse phases are respectively applied to the X and Y electrodes. Accordingly, a voltage difference between the X and Y electrodes alternates between being a Vs voltage and a −Vs voltage.

As shown in FIG. 9, while the X electrode is based at a ground voltage, the sustain pulse alternates between the Vs voltage and the −Vs voltage applied to the Y electrode. Accordingly, the voltage difference between the X and Y electrodes alternates between being a Vs voltage and a −Vs voltage.

While a three electrode PDP having the X, Y, and A electrodes has been described in exemplary embodiments of the present invention, various PDP types for firing the sustain discharge with the described sustain pulse may be applied in exemplary embodiments of the present invention.

In addition, while the frequency of the sustain pulse is determined by calculating the screen load ratio for each subfield according to the exemplary embodiment of the present invention, the frequency of the sustain pulse for each frame may be determined by calculating the screen load ratio for each frame. That is, the frequency of the sustain pulse in a frame having a greater screen load ratio may be controlled to be greater than the frequency of the sustain pulse in a frame having a lower screen load ratio. A voltage variation time of the sustain pulse in the frame having the greater screen load ratio may be controlled to be decreased to be shorter than a voltage variation time, the sustain pulse in the frame having the lower screen load ratio.

According to exemplary embodiments of the present invention, the power consumption determined by the active power and the reactive power may be minimized since the frequency of the sustain pulse varies according to the screen load ratio of the subfield or the frame.

While exemplary embodiments of the present invention have been described, it is to be understood that the invention is not limited to the disclosed embodiments, but, on the contrary, is intended to cover various modifications and equivalent arrangements included within the spirit and scope of the appended claims.

What is claimed is:

1. A plasma display comprising:

a plasma display panel having a plurality of first electrodes and a plurality of second electrodes and for displaying image based on a screen load ratio of a subfield or a frame wherein each frame is divided into a plurality of subfields including a first subfield and a second subfield and each subfield has a weight value;

a driver for applying a sustain pulse to die first electrodes or the second electrodes; and a controller for controlling a second frequency of the sustain pulse in the second subfield having a second screen load ratio to be higher than a first frequency of the sustain pulse in the first subfield having a first screen load ratio when the second screen load ratio of the second subfield is greater than the first screen load ratio of the first subfield, wherein the controller is adapted to increase a frequency of the sustain pulse by decreasing a sustain discharge voltage maintaining period of the sustain pulse when a sustain discharge voltage maintaining time is longer than a predetermined time, and wherein the controller is adapted to increase the frequency of the sustain pulse by decreasing a rising time or a falling time of the sustain pulse when the sustain discharge voltage maintaining time is equal to the predetermined time.

2. The plasma display of claim 1, wherein the controller controls a second voltage variation time of the sustain pulse in the second subfield to be shorter than a first voltage variation time of the sustain pulse in the first subfield.

3. The plasma display of claim 1, wherein the screen load ratio in each subfield is defined by a number of discharge cells turned on in the subfield.

4. The plasma display of claim 1, wherein the controller determines the screen load ratio of the frame based on an average signal level of image data of the frame, and determines a total number of the sustain pulses allocated to the frame according to the screen load ratio of the frame.

5. The plasma display of claim 1, wherein the controller stores a frequency of the sustain pulse according to the screen load ratio.

6. A plasma display comprising:

a plasma display panel having a plurality of first electrodes and a plurality of second electrodes and for displaying image based on a screen load ratio of a subfield or a frame wherein each frame is divided into a plurality of subfields and each subfield has a weight value;

a driver for applying a sustain pulse to the first electrodes or the second electrodes; and a controller for controlling a second frequency of the sustain pulse in a second frame having a second screen load ratio to be higher than a first frequency of the sustain pulse in a first frame having a first screen load ratio when the second screen load ratio of the second frame is greater than the first screen load ratio of the first frame, wherein the controller is adapted to increase a frequency of the sustain pulse by decreasing a sustain discharge voltage maintaining period of the sustain pulse when a sustain discharge voltage maintaining time is longer than a predetermined time, and wherein the controller is adapted to increase the frequency of the sustain pulse by decreasing a rising time or a falling time of the sustain pulse when the sustain discharge voltage maintaining time is equal to the predetermined time.

7. The plasma display of claim 6, wherein the controller controls a second voltage variation time of the sustain pulse in the second frame to be shorter than a first voltage variation time of the sustain pulse in the first frame.

8. The plasma display of claim 6, wherein the screen load ratio in each frame is defined by a number of discharge cells turned on in the frame.

9. The plasma display of claim 6, wherein the controller determines the screen load ratio of the frame based on an average signal level of image data of the frame, and determines a total number of the sustain pulses allocated to the frame according to the screen load ratio of the frame.

10. The plasma display of claim 6, wherein the controller stores a frequency of the sustain pulse according to the screen load ratio.

11. A driving method of a plasma display having a plurality of first electrodes and a plurality of second electrodes for performing a display operation in cooperation with the plurality of first electrodes, the plasma display being driven by each frame that is divided into a plurality of subfields including a first subfield and a second subfield, each of the plurality of subfields having a weight value, the driving method comprising:

determining a screen load ratio in each subfield from input image data;

determining a second frequency of the sustain pulse in the second subfield having a second screen load ratio to be higher than a first frequency of the sustain pulse in the first subfield having a first screen load ratio when the second screen load ratio of the second subfield is greater than the first screen load ratio of the first subfield; and displaying an image by applying the sustain pulse to the first electrodes or the second electrodes according to the determined frequency of the sustain pulse in each subfield, wherein a frequency of the sustain pulse is increased by decreasing a sustain discharge voltage maintaining period of the sustain pulse when a sustain discharge voltage maintaining time is longer than a predetermined time, and wherein the frequency of the sustain pulse is increased by decreasing a rising time or a falling time of the sustain pulse when the sustain discharge voltage maintaining time is equal to the predetermined time.

12. The driving method of claim 11, wherein a second voltage variation time of the sustain pulse in the second subfield that has a screen load ratio greater than that of the first subfield is controlled to be shorter than a first voltage variation time of the sustain pulse in the first subfield.

13. A driving method of a plasma display having a plurality of first electrodes, and a plurality of second electrodes for performing a display operation in cooperation with the plurality of the first electrodes, the driving method comprising:

determining a screen load ratio in each frame from input image data;

determining a second frequency of a sustain pulse in a second frame having a second screen load ratio to be higher than a first frequency of the sustain pulse in a first frame having a first screen load ratio when the second screen load ratio of the second frame is greater than the first screen load ratio of the first frame; and displaying an image by applying the sustain pulse to the first electrodes or the second electrodes according to the determined frequency of the sustain pulse in each frame, wherein a frequency of the sustain pulse is increased by decreasing a sustain discharge voltage maintaining period of the sustain pulse when a sustain discharge voltage maintaining time is longer than a predetermined time, and the frequency of the sustain pulse is increased by decreasing a rising time or a falling time of the sustain pulse when the sustain discharge voltage maintaining time is equal to the predetermined time.

14. The driving method of claim 13, wherein a second voltage variation time of the sustain pulse in the second frame that has a screen load ratio greater than that of a screen load ratio of the first frame is controlled to be shorter than a first voltage variation time of the sustain pulse in the first frame.

15. A plasma display comprising:

a plasma display panel having discharge cells formed by at least two electrodes;

a driver for applying a sustain pulse to at least one of the at least two electrodes in a sustain period; and a controller for minimizing an amount of power consumption of the plasma display panel according to a determined frequency of the sustain pulse allowing a sum of an active power and a reactive power caused by the sustain pulse to be minimized wherein the determined frequency of the sustain pulse is determined by a second frequency of the sustain pulse in a second subfield having a second screen load ratio to be higher than a first frequency of the sustain pulse in a first subfield having a first screen load ratio when the second screen load ratio of the second subfield is greater than the first screen load ratio of the first subfield.

16. The plasma display of claim 15, wherein the controller controls a second voltage variation time of the sustain pulse in the second subfield to be shorter than a first voltage variation time of the sustain pulse in the first subfield.

17. The plasma display of claim 15, wherein a screen load ratio in each subfield is defined by a number of discharge cells turned on in the subfield.

18. The plasma display of claim 15, wherein the controller determines a screen load ratio of a frame based on an average signal level of image data of the frame, and determines a total number of the sustain pulses allocated to the frame according to a screen load ratio of the frame.

19. The plasma display of claim 15, wherein the controller stores a frequency of the sustain pulse according to a screen load ratio.

20. A plasma display comprising:

a plasma display panel having discharge cells formed by at least two electrodes;

a driver for applying a sustain pulse to at least one of the at least two electrodes in a sustain period; and a controller for minimizing an amount of power consumption of the plasma display panel according to a determined frequency of the sustain pulse allowing a sum of an active power and a reactive power caused by the sustain pulse to be minimized wherein the determined frequency of the sustain pulse is determined by a second frequency of the sustain pulse in a second frame having a second screen load ratio to be higher than a first frequency of the sustain pulse in a first frame having a first screen load ratio when the second screen load ratio of the second frame is greater than the first screen load ratio of the first frame.

21. The plasma display of claim 20, wherein the controller controls a second voltage variation time of the sustain pulse in the second frame to be shorter than a first voltage variation time of the sustain pulse in the first frame.

22. The plasma display of claim 20, wherein a screen load ratio in each frame is defined by a number of discharge cells turned on in the frame.

23. The plasma display of claim 20, wherein the controller determines a screen load ratio of a frame based on an average signal level of image data of the frame, and determines a total number of the sustain pulses allocated to the frame according to a screen load ratio of the frame.

24. The plasma display of claim 20, wherein the controller stores a frequency of the sustain pulse according to a screen load ratio.

* * * * *

UNITED STATES PATENT AND TRADEMARK OFFICE
CERTIFICATE OF CORRECTION

PATENT NO. : 7,619,589 B2
APPLICATION NO. : 11/285491
DATED : November 17, 2009
INVENTOR(S) : Su-Yong Chae et al.

It is certified that error appears in the above-identified patent and that said Letters Patent is hereby corrected as shown below:

In the Claims

Column 9, Claim 1, line 3 Delete "die" Insert -- the --

Signed and Sealed this
Thirty-first Day of May, 2011

David J. Kappos

David J. Kappos
*Director of the United States Patent and Trademark Office*